United States Patent
Armistead (10) Patent No.: US 7,116,707 B1
(45) Date of Patent: Oct. 3, 2006

(54) MODEM FAILOVER WITHOUT CALL LOSS

(75) Inventor: R. Ashby Armistead, Los Altos, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/186,977

(22) Filed: Nov. 5, 1998

(51) Int. Cl.
*H04B 1/38* (2006.01)

(52) U.S. Cl. .................. 375/222; 375/220; 375/260; 370/238; 370/394; 340/825.26; 340/825.27

(58) Field of Classification Search ............... 375/222, 375/19, 220, 229, 231, 295, 219, 260; 379/242, 379/93.05, 93.07, 93.09, 93.08, 93.32, 269; 370/362, 401, 352, 252, 254, 259, 282, 384, 370/402, 394, 445; 395/200.7, 200.8; 714/13, 714/44; 340/825.01, 825.26, 825.27
See application file for complete search history.

(56) References Cited

U.S. PATENT DOCUMENTS

| | | | | |
|---|---|---|---|---|
| 4,245,342 A | * | 1/1981 | Entenman | 340/825.01 |
| 4,521,891 A | * | 6/1985 | Biba et al. | 375/222 |
| 4,987,571 A | * | 1/1991 | Haymond et al. | 370/445 |
| 5,528,595 A | * | 6/1996 | Walsh et al. | 370/402 |
| 5,546,379 A | * | 8/1996 | Thaweethai et al. | 370/254 |
| 5,771,232 A | * | 6/1998 | Sinibaldi et al. | 370/384 |
| 5,841,842 A | * | 11/1998 | Baum et al. | 379/93.32 |
| H001814 H | * | 11/1999 | Browning et al. | 379/242 |
| 6,038,222 A | * | 3/2000 | Osler et al. | 370/282 |
| 6,055,268 A | * | 4/2000 | Timm et al. | 379/242 |
| 6,064,693 A | * | 5/2000 | Oliver et al. | 375/222 |
| 6,067,317 A | * | 5/2000 | Fadavi-Ardekani et al. | 375/229 |
| 6,263,016 B1 | * | 7/2001 | Bellenger et al. | 375/222 |
| 6,307,880 B1 | * | 10/2001 | Evans et al. | 375/222 |
| 6,308,286 B1 | * | 10/2001 | Richmond et al. | 714/13 |
| 6,381,239 B1 | * | 4/2002 | Atkinson et al. | 370/362 |
| 6,385,203 B1 | * | 5/2002 | McHale et al. | 370/401 |
| 6,408,003 B1 | * | 6/2002 | Rezaiifar et al. | 370/394 |

\* cited by examiner

*Primary Examiner*—Khai Tran
*Assistant Examiner*—Edith Chang
(74) *Attorney, Agent, or Firm*—Marger Johnson & McCollom, P.C.

(57) ABSTRACT

A modem, multiple modem system, and method for operating each is disclosed. Modems in a multiple-modem system save their internal state information in a remote state memory. In the event of a modem failure, a resource controller transfers data-handling to a second available modem. The second modem configures itself using internal state information for the failed modem, as gleaned from the remote state memory. It then takes over the communication channel previously assigned to the failed modem before the modem at the opposite end of the channel discerns the modem failure and prevents call loss. This invention provides redundancy for systems that employ up to several hundred or even thousands of modems, insulating users of these systems from harmful or annoying effects due to partial equipment failure.

39 Claims, 4 Drawing Sheets

MODEM FAILOVER WITHOUT CALL LOSS

FIELD OF THE INVENTION

This invention pertains generally to modems, codecs, and methods for their operation, and more particularly to gateways and other interfaces containing multiple modem and/or codec resources.

BACKGROUND OF THE INVENTION

With the explosive growth of the World Wide Web, the race to deliver high-bandwidth access to the consumer is on. Competing bandwidth-delivery schemes include conventional analog modems, "digital" modems, integrated services digital networks (ISDN), asymmetrical digital subscriber line (ADSL) and its siblings, referred to collectively as xDSL, cable modems, and satellite network links.

For practical and historical reasons, companies offering data network access (e.g., network service providers, or "NSPs") today typically rely on at least some portion of the public system telephone network (PSTN) to deliver their product. Analog modems, digital modems, ISDN, and xDSL all utilize the consumer's "local loop", i.e., the copper wire twisted pairs(s) connecting the consumer's residence or business with a central office or branch. An analog modem connection may also connect to the ISP through a local analog loop. The fastest analog modems utilize a "half-digital" connection, i.e., the ISP connects to the PSTN digitally while each of their customers utilizes an analog connection. And with ISDN and xDSL, the connection utilizing the local loop is all digital.

A typical NSP may provide simultaneous data network access to hundreds or even thousands of customers through a single gateway connected to the PSTN. Such a gateway usually will not comprise a bank of discrete modems each connected to a phone line, but rather a group of modem cards, each containing multiple processors, all connected to a high-speed data bus. The high-speed data bus connects to the PSTN through an access concentrator. The access concentrator typically transmits and receives signals to and from the PSTN over multiple T1 or E1 connections, and performs format conversion between the T1/E1 format and the high-speed data bus format.

Because the quality of local loop connections can vary widely, sophisticated modems "train" to a best possible connect speed for each connection by a process of line probing. For instance, a "half-digital" modem connection utilizing the V.90 specification tests line transmission characteristics for each of the 256 possible 8-bit digital symbols during training. Training allows the modem pair to determine a subset of these symbols that can be received reliably by the analog end of that communication channel. The training process typically takes at least several seconds for each connection, and the results of the process are used to configure an internal state for each modem in the modem pair.

SUMMARY OF THE INVENTION

During operation, each modem in a multiple-modem gateway trains to a unique set of operating parameters for its current connection. If that modem fails, or is inadvertently or purposefully taken out of service by the NSP, the connection being handled by that modem is simply dropped by the gateway. A dropped customer may spend several minutes reconnecting to the gateway through a different modem and retracing their steps through the network. In some cases, customers may lose part of their work or be uncertain as to whether commands they were performing at the time of disconnect executed. A customer dropped while in the middle of executing a large on-line stock order, for instance, may even miss an opportunity to have the order execute at a desired price. As gateways continue to appear with the capability to emulate greater numbers of modems on a single circuit card, or even on a single digital signal processor, the possibility of a subsystem failure affecting a large number of customers raises a serious reliability concern for network service providers.

The present invention seeks to enhance the operation of network gateways, and data communication interfaces generally, by safeguarding against dropped connections. Generally, this is accomplished in the present invention by providing redundancy for modems and/or other data-handling resources such as fax transceivers, voice codecs, video codecs, and larger resources implementing multiple modems, transceivers, or codecs. Each of these resources develops an internal resource state, e.g., related to communication channel characteristics and/or data characteristics, during a data connection. A network gateway utilizing the present invention provides redundancy for a given resource by saving critical resource state information, normally found only in the resource itself, in a separate resource state memory. If a condition, such as an out-of-service condition, is detected for a resource, state information for that resource, along with the data stream for the resource, is directed to available, functional resources. Resources receiving redirected data attempt to recreate a state that allows the data connection to continue without call loss.

In one aspect of the invention, a data communication interface is disclosed. The interface comprises a data bus, first and second data-handling resources, a resource state memory, and a data-handling resource controller. Both data-handling resources are connectable to the data bus. The resource state memory is configured to store state information from the first data-handling resource. State information stored in the resource state memory is loadable into the second data-handling resource. The data-handling resource controller responds to conditions requiring that a data connection be switched off of the first data-handling resource by initiating switchover of the connection to the second data-handling resource.

Typically, the data communication interface will comprise N+1 resources, where N>1. In such a situation, N of the resources may be backed up by one additional resource if each of the N resources saves state information in the resource state memory. The additional resource may be strictly a spare, or it may be used under peak loading, in which case no redundancy may exist at peak loading.

The present invention applies to data communication interface subsystems also. For instance, a data communication interface may comprise multiple modem cards, each having several digital signal processors emulating modems. Each card may provide on-card redundancy for its individual processors.

In another aspect of the invention, a modem is disclosed. This modem writes internal state information to an external location while servicing a modem connection. Preferably, the modem also has the capability to read state information from an external location and configure itself to begin servicing an existing modem connection. This second capability may also exist in a modem that does not have the capability to save internal state information.

In a further aspect of the invention, a method of operating a data communication interface having multiple data-handling resources is disclosed. This method comprises saving internal state information from an active data-handling resource in a location separate from the data-handling resource. The active data-handling resource is monitored for conditions, such as resource fault conditions, requiring removal of an active data connection from the resource. If and when such conditions occur, the saved internal state information for the active data connection is loaded into a second data-handling resource having the capacity to handle the data connection, and data-handling for the data connection is transferred to the second data-handling resource. Preferably, the identity of the second data-handling resource is determined at the time of the fault, based on system loading or other statistics.

BRIEF DESCRIPTION OF THE DRAWING

The invention may be best understood by reading the disclosure with reference to the following figures, wherein.

DETAILED DESCRIPTION OF THE PREFERRED EMBODIMENTS

The present invention generally applies to data communication interfaces and their operation. Data communication interfaces that may benefit from the present invention share a common characteristic—the existence of multiple data-handling resources, within the interface, that develop state information regarding communication channel and/or data-handling characteristics affecting a particular data connection. One common data communication interface is a data network gateway that connects PSTN customers to, e.g., a packet-switched data network that uses IP addressing. For a given data connection, such a gateway looks like a modem on the PSTN side and looks like an IP node on the data network side. Similar interfaces may exist in systems servicing cable modem customers, satellite modem customers, or customers using other phone-line based data access systems. Data communication interfaces may also allow multiple users to remotely access a specific system, rather than a network.

The following terms have the following meanings for purposes of this disclosure. A data-handling resource provides data transformation for one or more data connections in a data communication interface. Some examples of data-handling resources are modems, fax translators, voice encoders and decoders, and video coders and decoders. Internal state information is data transformation and communication information, specific to a given data connection, that a data-handling resource develops over the course of a connection. A modem sends and/or receives digital data in a modulated format compatible with a desired communications medium, but an A/D or D/A converter needed to complete the connection may exist separate from the modem.

The ultimate goal of the present invention is to provide a mechanism for a timely and effective transfer of data handling between resources. The transfer should be timely for at least two reasons: first, significant amounts of data may be lost if the transfer is not timely, making recovery difficult; second, and perhaps more important, a break in communication must be short enough that the equipment or person at the opposite end of the connection will not perceive a dropped connection and abandon the connection. In order for the transfer to be effective, the newly-connected resource must pick up a connection "speaking the same language" as the disconnected resource. Each of these concepts will be explored in turn.

The switchover of data-handling resources contemplated by the present invention may appear in two contexts. In the first context, the "scheduled" switchover, the first resource continues to handle data for a connection until commanded to halt. In the second context, the switchover is unscheduled. In this case, the data communication interface must detect that the first data-handling resource has failed or is failing. This will usually involve a break in data-handling for an active connection, which the second resource must clean up.

Timely Scheduled Switchovers

In the scheduled switchover context, a data communication interface initiates a transfer of a data connection away from a resource that is still effectively handling the connection. For instance, a technician may desire to replace a modem board, and may initiate a command to transfer active connections away from that board first. Or, system load dynamics may change such that resource loading becomes unbalanced, and the system may initiate transfers to equalize loading. In either case, adequate time exists to bring a new resource up to speed before initiating a switchover.

Preferably, system architecture allows data from a given data connection to flow simultaneously to two resources (if not, the switchover can, e.g., use unscheduled switchover techniques). The new resource can thus begin seeing the data that the current resource is processing before it actually becomes the primary resource for the connection.

Timely Unscheduled Switchovers

In the unscheduled switchover context, a data communication interface initiates a transfer of a data connection away from a resource after determining that the resource is no longer effectively handling the connection. This may happen because a resource has been physically disconnected from the interface, lost power, locked up, or merely broken. Because such an occurrence cannot be predicted in advance, the interface must rely on the last state information saved by the resource before the failure. The new resource assigned to the connection must attempt to patch up the discontinuity that occurred due to the failure. The resource must also begin handling the connection before the equipment or person at the other end of the connection perceives a drop and terminates the connection. For instance, after 700 milliseconds many modems will consider a connection lost and terminate it—the new resource must send some signal within this time frame to prevent a drop.

Effective Switchover Techniques

In order to be effective, switchover generally need not be transparent. The degree to which data loss can be tolerated depends on the application. At the very least, the new resource must at least initially follow the same protocol as the old resource. Preferably, this will also include using consistent frame numbering, consistent error coding, and consistent compression techniques.

System Design Alternatives

Figure 1:
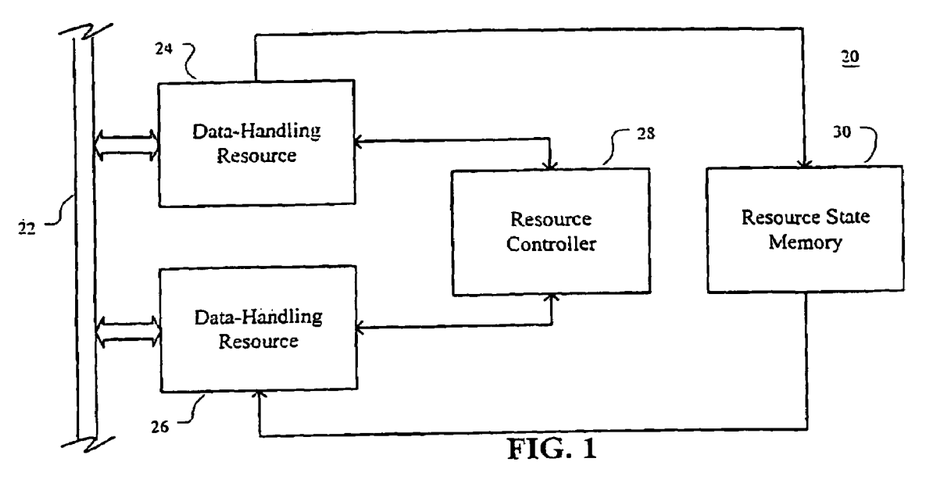
FIG. 1 illustrates a data communication interface according to one embodiment of the invention.

FIG. 1 illustrates a data communication interface 20 according to one embodiment of the present invention. Data bus 22 carries data for one or more data connections. Data-handling resources 24 and 26 both connect to data bus 22 and communicate with resource controller 28. Data-handling resources 24 and 26 also connect to resource state memory 30.

Normal operation of the system is as follows. Data-handling resource 24 participates in new data connections through data bus 22. As resource 24 develops internal state information about the operation of a connection, it saves some of this information to resource state memory 30. Meanwhile, resource controller 28 remains ready to respond to conditions that warrant removal of the data connection from resource 24. Data-handling resource 26 sits ready to take over connections as required.

When a connection is to be switched from resource 24 to resource 26, resource controller 28 signals resource 26. As systems benefiting from the invention have the capability for multiple simultaneous data connections, the signal should contain information appropriate to allow resource 26 to ascertain how to access data connection information from both resource state memory 30 and data bus 22. Data-handling resource 26 loads state information (i.e., the information previously saved by resource 24 for the data connection) from resource state memory 30 and configures itself according to this information. Resource 26 accesses data bus 22 to serve the data connection previously served by resource 24.

Figure 2:
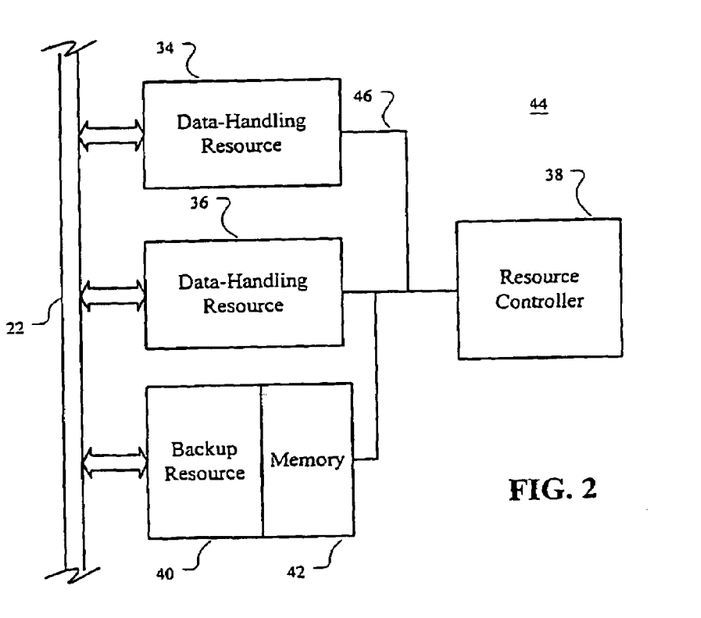
FIG. 2 illustrates a data communication interface according to a second embodiment of the invention.

With reference to the embodiment of FIG. 2, several additional aspects of the present invention will now be described. FIG. 2 shows a data communication interface 44 having two primary data-handling resources 34, 36 connected to data bus 22. In addition, backup resource 40 connects to data bus 22. Backup resource 40 also contains a memory 42. Resources 34, 36, 40, and resource controller 38 are connected by control bus 46. This embodiment illustrates an architecture where a single resource provides redundancy for two (or more) primary resources. This embodiment further illustrates that the backup resource may be a specialized resource, e.g., one that also handles state-saving for the primary resources and does not process data from data bus 22 during normal system operation.

In operation, resources 34 and 36 are responsible for placing state information on control bus 46. Backup resource 40 saves the state information placed on control bus 46 by each resource 34, 36 in memory 42. In the event of a failure in either resource 34 or resource 36, resource controller 38 instructs backup resource 40 to take over data connections impaired by the failure. Backup resource 40 accesses state information pertaining to the failed resource and attempts to continue the impaired connections.

A Redundant Subsystem

Figure 3:
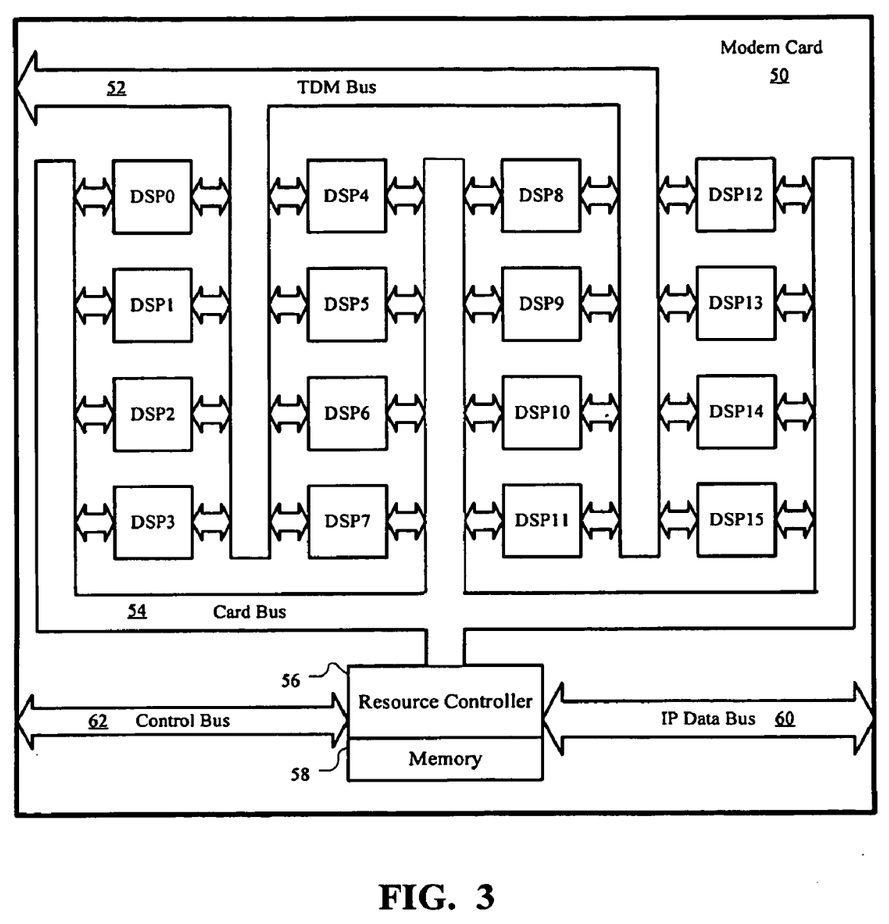
FIG. 3 shows a multiple-modem subsystem according to yet another embodiment of the present invention.

FIG. 3 illustrates several additional operational principles, as well as the application of the invention to a data communication interface subsystem. Subsystem 50 comprises a modem card for a network interface. TDM (time-division multiplexed) bus 52, which has the capacity to carry at least several hundred 8 kHz 8-bit PCM data streams, provides a first external interface for the card. IP data bus 60 provides a second external interface for card 50. Control bus 62 provides a third external interface for the card.

Modem card 50 contains 17 processors—resource controller 56 (a general purpose microprocessor), and 16 digital signal processors DSP0 through DSP15 that function as modem resources. Each digital signal processor has throughput sufficient to emulate digital data-handling for one or more modems. Resource controller 56 controls overall card operation and handles off-card communications through busses 60 and 62.

If operated as a prior art data communication interface, modem card 50 would receive system commands over control bus 62, e.g., instructing resource controller 56 to handle a call at a specific time slot on TDM bus 52. Resource controller 56 would hand processing for the call off to one of digital signal processors DSP0 through DSP15, for example, DSP0. DSP0 would access PCM data from TDM bus 52 at the specified time slot, demodulate the PCM data, and transform the data into frames or packets compatible with an IP format. DSP0 sends transformed data frames via card bus 54 to resource controller 56, which routes the data as packets onto IP bus 60. If DSP0 malfunctioned, the call would simply be dropped.

When operated as an embodiment of the present invention, modem card 50 provides redundancy for each of DSP0 through DSP15 without incorporating a dedicated backup DSP. Each DSP on modem card 50 provides state information for its current data connections, through card bus 54, to resource controller 56 at periodic intervals. Controller 56 stores state information in memory 58. If controller 56 detects a failure in one of DSPs DSP0 through DSP15, it searches for an available functional DSP resource from among DSP0 through DSP15. Active data connections from the failed resource are then redirected to the alternate resource. Resource controller 56 uploads state information pertaining to the now-failed resource into the alternate resource and instructs the resource to pick up the data connection at the appropriate TDM time slot.

The architecture and operation of card 50 provide several desirable features. During peak loading, each DSP resource may be utilized to maximize throughput, i.e., no resource must sit idle in order to provide backup capability (although if all functional channels are utilized, the card will temporarily lose internal backup capability). Card 50 also provides flexibility, in that any available resource may be used to back up any other resource on the card. This flexibility extends to distributing data connections from a single failed resource among several available or partially-available resources. In addition, multiple failed resources can be tolerated. Finally, DSP switchover operation on the card is virtually transparent to an overall system using the card.

Modem card 50 can also provide external redundancy for each DSP. If, at the time of a DSP failure, no available functional resource exists on the card, state information for data connections assigned to the failed resource may be sent over control bus 62 to other parts of the system.

State-Saving Considerations

The level of data saved in memory 58 may be varied, either dynamically or to a preset level. For example, when system loading is low, sufficient throughput may exist to allow a more complete state picture to be saved. During periods of higher loading, the state picture may be limited to the minimum necessary to avoid dropping a connection. In any particular system, bandwidth, memory size, and the difficulty of recovering from a potential loss of data at resource switchover must be traded off to arrive at an appropriate level of state-saving.

By way of illustration, suppose that a new modem call is routed to card 50 and specifically modem DSP4. In handling the call, DSP4 first determines the capabilities of the modem on the other end of the modem call during handshaking. If the modems decide upon a common standard such as V.32bis, V.34, or V.90, all deployed by the International Telecommunications Union (ITU), during handshaking the modems will probe the communication channel to determine a reliable set of symbols to be used for communication. Generally, the set chosen will be a function of channel noise, channel non-linearities, and the robustness of the modem at the other end of the line. The symbol set, connect speed, error control information, and connection standard are saved to memory 58 once the connection is established.

Standards such as V.34 and V.90 provide mechanisms for continuous line probing, and may adjust symbol set and connect speed as the connection progresses. These adjustments are also noted in memory 58 as they occur.

Modem connections typically utilize a data compression standard, such as V.42bis, to compress data where possible before transmission. Such standards generally build and maintain a codebook at both ends of the connection. Where such a standard is in use, it is preferable that the codebook values also be saved in memory 58. As an option, a modem attempting to pick up an established connection may request to the opposite end that it reset codebooks for both transmit and receive, e.g., using the C-INIT command of V.42bis.

Modems typically employ link control. Basically, link control involves a protocol for acknowledging the receipt of frames. If a frame is received with no errors, the receiver transmits an ACK signal back to the sender. If a frame is received with errors, a NAK signal is sent back to the sender, who then retransmits the frame. If neither signal is received by the sender within a preset time of it sending a frame, it assumes that the frame was lost and it resends it. Preferably, DSP4 would save link control information to memory 58 also.

DSP4 may modify its normal link control operation in order to function according to an embodiment of the invention saving link control information in state memory 58. For instance, DSP4 may delay sending ACK signals for a frame until it has fully processed and disposed of the frame, and noted the frame receipt in state memory 58. DSP4 may also note frames for which it has sent ACK or NAK signals in memory 58.

As the modem communicating with DSP4 will also be receiving frames and sending ACK and NAK signals, it is preferable that state memory 58 also contain data necessary to respond to these signals. To provide this capability DSP4 saves frames that it transmits in state memory 58, along with their transmission time. It marks these frames as successfully transmitted once an ACK signal for the frame is received, and the frames may then be overwritten in state memory 58.

Figure 5:
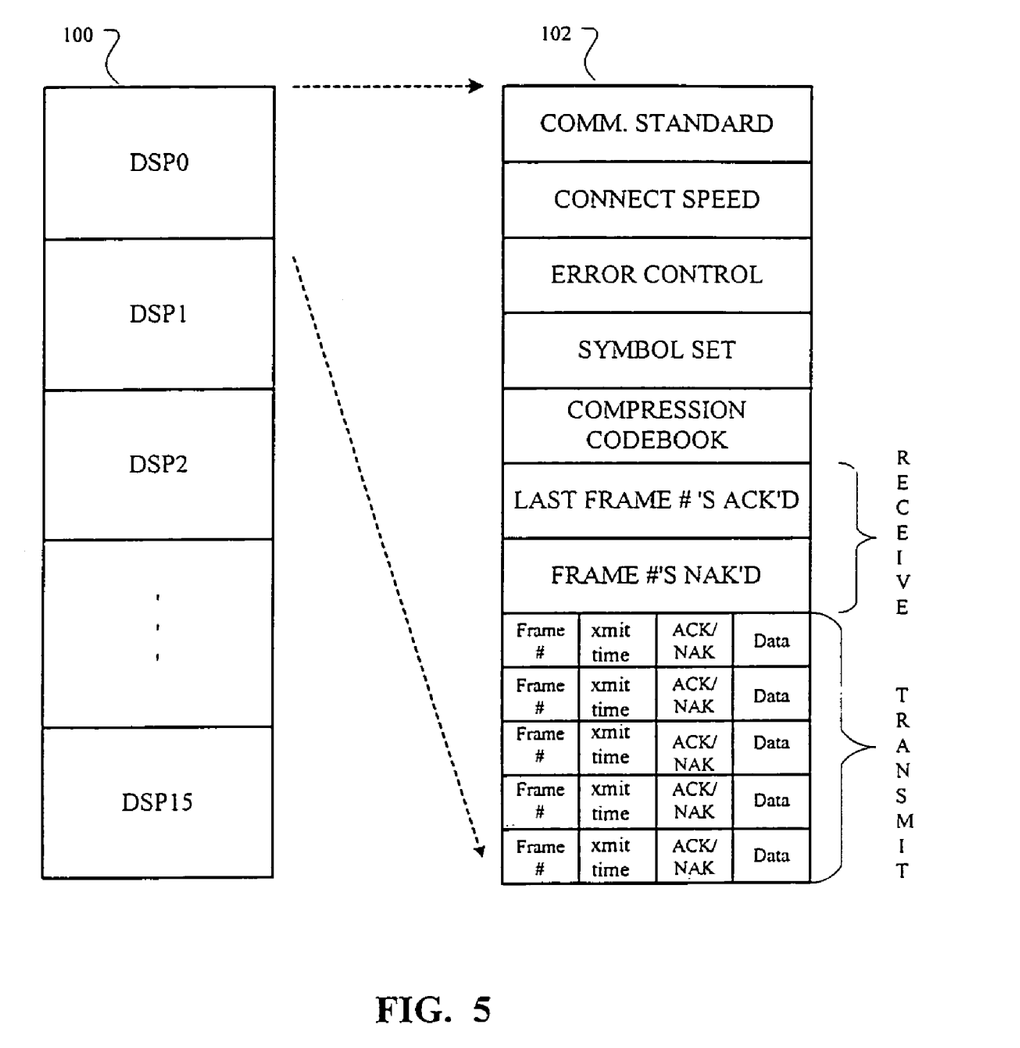
FIG. 5 illustrates a possible memory map for a state memory in the embodiment of FIG. 3.

FIG. 5 illustrates one suggested memory map for state memory 58. Each DSP is assigned a portion of memory map 100, and is responsible for keeping these contents current (alternatively, currency and map management may be handled by controller 56). For instance, DSP0 may be assigned a first portion of map 100, which may be partitioned into several fields as shown in detail map 102. Although this list is not exhaustive, nor would all fields apply to every possible communication standard (indeed, different partitioning of detail map 102 may be used for different standards), the map arranges data such that a second resource may read it and ascertain the current state of the resource.

The "Receive" section of detail map 102 may list recent activity. Generally, unless a frame has been ACK'd prior to modem failure, a substituted modem can request retransmission. Therefore, a list of the last received frames ACK'd and NAK'd should allow a substituted modem to know which frames are needed upon switchover.

The "Transmit" section of detail map 102 may contain a series of records each representing a frame. Records may show the frame number, the last transmit time if it has been transmitted, whether the frame has been ACK'd or NAK'd, and the data contained in the frame. Preferably, these records are kept current such that a substituted modem may respond to requests from a paired modem.

One way in which resource controller 56 may discover modem failures is to monitor DSP4's state-saving actions. If DSP4 stops saving state, or acts in an undefined manner, resource controller 56 commands an available resource, e.g., DSP8, to take over DSP4's data connection. DSP8 then loads state information pertaining to DSP4's data connection from memory 58, and begins monitoring the appropriate TDM time slot on bus 52. DSP8 configures its internal registers to reflect the symbol set, connect speed, error control information, and connection standard used on the data connection. DSP8 loads compression codebook information, or otherwise suspends or restarts data compression. DSP8 loads pending frames (i.e., those sent by DSP4 but not acknowledged) from state memory 58, and begins responding to ACK and NAK signals from the opposite end of the connection.

As DSP8 begins to receive frames from TDM bus 52, it compares the frame numbers to the receive link control information saved by DSP4 prior to its failure. From this comparison, DSP8 determines intermediate frames that were not successfully processed by DSP4 prior to its failure, and sends NAK signals for those frames.

As an alternative, if a "retrain" command is available under the communication protocol utilized for the data connection, DSP8 may merely advise its paired modem to retrain or revert to a known state. This command may be particularly advantageous where memory or time limitations prohibit the saving of a complete state picture.

For most systems however, state saving will require a small amount of memory and a negligible percentage of the processing power of a modem resource. For instance, a modem resource may execute 20 million-instructions-per-second (MIPS) in emulating a V.34 modem having a maximum transmitted data rate of 33,600 bits per second, or 4,200 bytes per second. If one percent of the resource's 20 MIPS were dedicated to saving state, 200,000 instructions, or 47 instructions per byte transmitted, would be available to save state.

A Double-Redundant System

Figure 4:
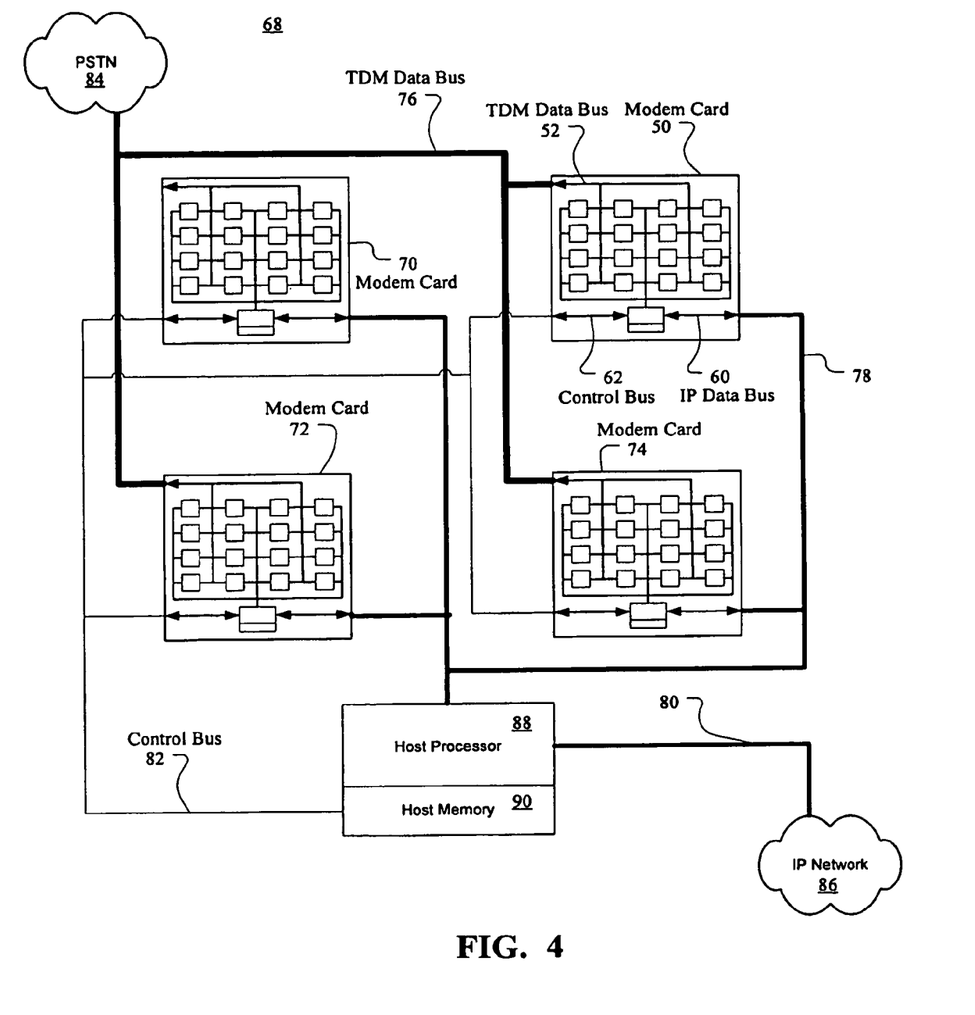
FIG. 4 shows a data network gateway configured according to an embodiment of the invention.

FIG. 4 shows modem card 50 connected in a data communication interface 68. Interface 68 provides a termination point for modem connections to PSTN 84, and resembles one or more IP nodes to IP network 86. Interface 68 comprises four identical modem cards 50, 70, 72, and 74. TDM data bus 52 on card 50 is an extension of TDM data bus 76, which connects to each modem card in similar fashion and is also interfaced to PSTN 84 (typically through an access concentrator, not shown). Card 50's IP data bus 60, along with the IP data busses of cards 70, 72, and 74 all connect via bus 78 to host processor 88. A control bus 82 also connects to each card, including control bus 62 on card 50. Host processor 88 comprises a host memory 90.

Data-handling redundancy for interface 68 is provided both at the card level and at the system level. For example, in addition to saving state information in memory 58, card 50 communicates state information over bus 78 or 82 to host processor 88, for storage in host memory 90. If card 50 malfunctions or is removed, state information pertaining to card 50's active connections may be transferred by host processor 88 to one or more of cards 70, 72, and 74.

Other data-handling resources may also be provided with call-continuation redundancy via the method of the invention. Each will require state information saving appropriate to the type of resource. Some resources, such as audio and video codecs, may be more tolerant of missing data than a modem, and may thus require minimal state memory.

By way of example, the following provides examples of potentially savable state information for an audio codec. Audio codecs encode and decode digital audio streams using specific coding standards, such as G.723 or G.729, both also promulgated by ITU. Coding standards generally specify the coded bit rate and format of encoded frames. Other parameters, such as frame size, may be varied by the user. Each frame is assigned a sequence number, which is used to estimate frame transmission delay and re-order frames received out of sequence. Some codecs also employ predictive coding, wherein the bit rate of a frame is reduced by not transmitting information that can be predicted from preceding frames. Thus, helpful information that may be stored in a codec resource memory would include the applicable transmission standard, bit rate, and frame size, sequence numbers for recently transmitted and received frames, playout delay estimates, current values of predictive coefficients, and perhaps received-but-not-yet-played frames. Note that predictive coefficients can be relearned, and missing frames generally result in a short garbled section of speech, such that codec switchover with minimal state information generally produces only momentary degradation.

The teachings of the present invention may be applied to other data-handling resources, e.g., those that modulate, demodulate, encode, and/or decode data in a data communication interface. After reading this disclosure, one of ordinary skill in the data communications art will recognize that a wide range of design latitude exists for implementing the invention. For example, who saves internal state information and how it gets saved are design considerations. In particular, in some instances frame data may be taken directly off of a bus, and need not necessarily be explicitly saved by a resource before being stored in a state memory. Timing considerations for initializing a resource to another resource's state are also best left to an individual designer. Other modifications to the disclosed embodiments will be obvious to those of ordinary skill in the art upon reading this disclosure, and are intended to fall within the scope of the invention as claimed.

What is claimed is:

1. A data communication interface comprising:
   a data bus;
   a resource internal state memory that stores internal state information for an existing data connection, the internal state information containing data transformation and data link control information developed by a data-handling resource over the course of the existing data connection;
   first and second data-handling resources connected to said data bus, to provide data transformation for one or more data connections, each data-handling resource connected to said resource internal state memory such that the internal state information from said first data-handling resource is savable in said resource internal state memory and is retrievable from said resource internal state memory by said second data-handling resource, where the internal state information is savable and retrievable over a bus separate from the data bus; and
   a data-handling resource controller that responds to one or more conditions indicating that data from a first data connection should no longer be directed to said first data-handling resource due to failure or removal of said first data-handling resource, by directing said data from said first data connection to said second data-handling resource without loss of said first data connection, where said first data-handling resource ceases to operate upon failure, the data-handling resource controller periodically saves internal state information associated with the first data-handling resource to the resource internal state memory and directly monitors the first data-handling resource to detect the failure or removal.

2. The data communication interface of claim 1, wherein said first data-handling resource comprises a first digital signal processor, and said second data-handling resource comprises a second digital signal processor.

3. The data communication interface of claim 2, wherein said first and second digital signal processors reside on a common circuit card within said data communication interface.

4. The data communication interface of claim 3, wherein said data-handling resource controller and said resource internal state memory also reside on said common circuit card.

5. The data communication interface of claim 2, wherein said first digital signal processor resides on a first circuit card within said interface, and wherein said second digital signal processor resides on a second circuit card within said interface, said second circuit card sharing a common bus with said first circuit card.

6. The data communication interface of claim 5, wherein said data-handling resource controller resides on a third circuit card within said data communication interface.

7. The data communication interface of claim 1, wherein said first data-handling resource comprises a first circuit card comprising multiple digital signal processors, and said second data-handling resource comprises a second circuit card comprising multiple digital signal processors.

8. The data communication interface of claim 7, wherein said first and second circuit cards each comprise a card internal state memory and save corresponding internal state information from their respective digital signal processors in their respective card internal state memories.

9. The data communication interface of claim 7, wherein said first data-handling resource can receive multiple simultaneous data connections, and wherein said second data-handling resource can receive a simultaneous transfer of all connections received by said first data-handling resource to said second data-handling resource.

10. The data communication interface of claim 7, wherein said first data-handling resource can receive multiple simultaneous data connections, and wherein said second data-handling resource can receive a transfer of selected connections received by said first data-handling resource to said second data-handling resource.

11. The data communication interface of claim 1 wherein the controller is configured to directly monitor the first data-handling resource for failure and to transfer a communication to the second data-handling resource after detecting a failure of the first data-handling resource.

12. The data communication interface of claim 11, wherein the controller is further configured so that the transfer of a communication to the second data-handling resources occurs independently of communications with the first data-handling resource.

13. A data communication interface comprising:
   a data bus;
   a resource internal state memory capable of storing internal state information for an existing data connection, the internal state information containing data transformation and data link control information developed by a data-handling resource over the course of the existing data connection;

N+1 data-handling resources, wherein N>1, each connected to said data bus, to provide data transformation for one or more data connections, each data-handling resource connected to said resource internal state memory such that the internal state information from the first N of said N+1 data-handling resources is savable in said resource internal state memory and is retrievable from said resource internal state memory by the N+1th said data-handling resource, where the internal state information is savable and retrievable over a bus separate from the data bus; and a data-handling resource controller that responds to one or more conditions indicating that data from a first data connection should no longer be directed to any one of the first N of said N+1 data-handling resources due to failure or removal of the any one of the first N of said N+1 data-handling resources, by directing said data from said first data connection to said N+1th data-handling resource without loss of said first data connection, where the data-handling resource controller periodically saves internal state information associated with the first N of said N+1 data-handling resources to the resource internal state memory and directly monitors the first N of said N+1 data-handling resources to detect the failure or removal.

14. The data communication interface of claim 13, wherein the N+1th data-handling resource is only assigned data from said first data connection in response to said one or more conditions.

15. The data communication interface of claim 13, wherein internal state information from each of said N+1 data-handling resources is savable in said resource internal state memory and retrievable by more than one of said N+1 data-handling resources.

16. The data communication interface of claim 13, wherein each of said N+1 data-handling resources emulates at least one modem.

17. The data communication interface of claim 13, wherein each of said N+1 data-handling resources emulates at least one voice codec.

18. A data communication interface comprising:
a data bus;
a resource internal state memory capable of storing internal state information for an existing data connection, the internal state information containing data transformation and data link control information developed by a data-handling resource over the course of the existing data connection;
N data-handling resources, wherein N>1, each connected to said data bus, to provide data transformation for one or more data connections, each data-handling resource connected to said resource internal state memory such that internal state information from each of said N data-handling resources is savable in said resource internal state memory and is retrievable from said resource internal state memory by any other of said N data-handling resources, wherein all N data-handling resources are capable of receiving data simultaneously, where the internal state information is savable and retrievable over a bus separate from the data bus; and
a data-handling resource controller that responds to one or more conditions indicating that data from a first data connection should no longer be directed to one of said N data-handling resources due to failure or removal of the one of the said N data-handling resource, by directing said data from said first data connection to another of said N data-handling resources without loss of said first data connection, where the data-handling resource controller periodically saves internal state information associated with one or more of the N data-handling resources to the resource internal state memory and directly monitors the N data-handling resources to detect the failure or removal.

19. The data communication interface of claim 18, wherein said N data-handling resource controller drops said first data connection when all functional data-handling resources are busy at the time of occurrence of said one or more conditions.

20. The data communication interface of claim 18, wherein said data-handling resource controller responds to the one or more conditions indicating that data from the first data connection should no longer be directed to any one of N data-handling resources, by directing said data from said first data connection to any idle data-handling resource.

21. The data communication interface of claim 18 wherein the resource internal state memory further comprises a list of received frame acknowledgements.

22. The data communication interface of claim 18 therein the resource internal state memory further comprises a list of not received frame acknowledgements.

23. The data communication interface of claim 18 wherein the resource internal state memory further comprises records representing frames, each record showing the frame number, the last transmit time if the frame has been transmitted, whether the frame has been acknowledged or not acknowledged, and the data contained in the frame, where the data in a frame included in the resource internal state memory includes data associated with a large on-line stock order.

24. A multiple-modem subsystem, said multiple-modem subsystem comprising:
a data bus;
a resource internal state memory capable of storing internal state information for an active modem connection, the internal state information containing data transformation and data link control information developed by a modem resource over the course of the active modem connection;
multiple modem resources, to provide data transformation for one or more active modem connections, each modem resource connected to said data bus and to said resource internal state memory such that internal state information from the modem resources is savable in said resource internal state memory and is retrievable from said resource internal state memory by other modem resources, where the internal state information is savable and retrievable over a bus separate from the data bus; and
a modem resource controller that responds to failure or removal of any one of said modem resources during an active modem connection by transferring said active modem connection to another modem resource that retrieves the internal state information for the failed one of the modem resources, where the modem resource controller periodically saves internal state information associated with the modem resources to the resource internal state memory and directly monitors the modem resources to detect the failure or removal.

25. The multiple-modem subsystem of claim 24, wherein each of said modem resources comprises a digital signal processor.

26. The multiple-modem subsystem of claim 24, wherein each of said modem resources comprises a circuit card.

27. A method of operating a data communication interface comprising multiple data-handling resources to provide data transformation for one or more data connections, said method comprising the steps of:
- periodically saving internal state information from an active data-handling resource in a location separate from said active data-handling resource, the internal state information containing data transformation and data link control information developed by the active data-handling resource over the course of a data connection, where saving internal state information is performed over a bus separate from the data connection;
- directly monitoring said active data-handling resource for one or more conditions requiring removal of a data connection from said active data-handling resource due to failure or removal of said first data-handling resource; and
- upon occurrence of a condition requiring removal of the data connection from the active data-handling resource, loading internal state information related to said data connection into a second data-handling resource having excess capacity sufficient to handle the data connection, and transferring the processing of said data connection to said second data-handling resource.

28. The method of claim 27, wherein said second data-handling resource comprises a redundant resource.

29. The method of claim 27, wherein said active data-handling resource can receive multiple simultaneous data connections, and wherein said transferring step comprises transferring the processing of each of the multiple simultaneous data connections to said second data-handling resource.

30. The method of claim 27, wherein said active data-handling resource can receive multiple simultaneous data connections, and wherein said transferring step comprises distributing the processing of the multiple simultaneous data connections to multiple data handling resources having excess capacity.

31. The method of claim 27, further comprising varying the periodical saving of internal state information depending on the data connection load handled by the data communication interface.

32. The method of claim 27, wherein saving internal state information further comprises saving frame receipt information for frames received.

33. The method of claim 32, further comprising delaying the sending of a frame acknowledgement signal until frame receipt information has been saved as internal state information.

34. The method of claim 27, further comprising saving frames, transmitted over the data connection, in the internal state information at least until the frames are acknowledged.

35. A data communication interface comprising:
- a data bus;
- a resource internal state memory that stores internal state information for an existing data connection, the internal state information containing data transformation and data link control information developed by a data-handling resource over the course of the existing data connection;
- first and second data-handling resources connected to said data bus, to provide data transformation for one or more data connections, each data-handling resource connected to said resource internal state memory such that the internal state information from said first data-handling resource is savable in said resource internal state memory and is retrievable from said resource internal state memory by said second data-handling resource, where the internal state information is savable and retrievable over a bus separate from the data bus; and
- a data-handling resource controller that responds to one or more conditions indicating that data from a first data connection should no longer be directed to said first data-handling resource due to failure or removal of said first data-handling resource, by directing said data from said first data connection to said second data-handling resource without loss of connection
- wherein the resource internal state memory further comprises
- a list of received frame acknowledgements,
- a list of not received frame acknowledgements, and
- records representing frames, each record showing the frame number, the last transmit time if the frame has been transmitted, whether the frame has been acknowledged or not acknowledged, and the data contained in the frame, wherein the data in a frame included in the resource internal state memory includes data about a large on-line stock order.

36. A data communication interface comprising:
- a resource internal state memory that stores internal state information for an existing data connection, the resource internal state memory including a list of received frame acknowledgements, a list of not received frame acknowledgements, records representing frames, each record showing the frame number, the last transmit time if the frame has been transmitted, whether the frame has been acknowledged or not acknowledged, and the data contained in the frame, where the data in a frame included in the resource internal state memory includes data associated with a large on-line stock order;
- first and second data-handling resources connected to a data bus, to provide data transformation for one or more data connections, each data-handling resource connected to said resource internal state memory such that the internal state information from said first data-handling resource is savable in said resource internal state memory and is retrievable from said resource internal state memory by said second data-handling resource; and
- a data-handling resource controller that responds to one or more conditions indicating that data from a first data connection should no longer be directed to said first data-handling resource, by directing said data from said first data connection to said second data-handling resource without loss of said first data connection.

37. The data communication interface of claim 36, where the data-handling resource controller directs said data from said first data connection responsive to the failure or removal of said first data-handling resource.

38. The data communications interface of claim 37, where said first data-handling resource ceases to operate upon failure.

39. The data communication interface of claim 37, where the data-handling resource controller directly monitors said first data-handling resource to detect the failure or removal.

* * * * *